US009171101B2

(12) United States Patent
Mbaye

(10) Patent No.: US 9,171,101 B2
(45) Date of Patent: Oct. 27, 2015

(54) DATA CONVERTER

(75) Inventor: Kangolongo Alexandra Mbaye, Villemomble (FR)

(73) Assignee: CREAGEST, Luxembourg (LU)

( * ) Notice: Subject to any disclaimer, the term of this patent is extended or adjusted under 35 U.S.C. 154(b) by 218 days.

(21) Appl. No.: 13/637,289

(22) PCT Filed: Mar. 23, 2011

(86) PCT No.: PCT/EP2011/054495
§ 371 (c)(1),
(2), (4) Date: Nov. 30, 2012

(87) PCT Pub. No.: WO2011/117321
PCT Pub. Date: Sep. 29, 2011

(65) Prior Publication Data
US 2013/0073595 A1 Mar. 21, 2013

(30) Foreign Application Priority Data
Mar. 25, 2010 (FR) ...................... 10 52167

(51) Int. Cl.
G06F 17/30 (2006.01)
H04L 29/08 (2006.01)

(52) U.S. Cl.
CPC .... *G06F 17/30914* (2013.01); *G06F 17/30569* (2013.01); *H04L 67/289* (2013.01); *H04L 67/2823* (2013.01)

(58) Field of Classification Search
None
See application file for complete search history.

(56) References Cited

U.S. PATENT DOCUMENTS

2004/0060004 A1* 3/2004 Mani et al. .................. 715/513
2006/0208873 A1* 9/2006 Lesesky et al. ............. 340/531
2006/0288021 A1* 12/2006 Kojima ....................... 707/100

FOREIGN PATENT DOCUMENTS

EP 0936788 A1 8/1999

OTHER PUBLICATIONS

French Search Report and Written Opinion dated Feb. 9, 2011 for corresponding French Application No. FR 1052167, filed Mar. 25, 2010.
International Search Report dated Apr. 6, 2011 for corresponding International Application No. PCT/EP2011/054495, filed on Mar. 23, 2011.
International Preliminary Report on Patentability and English Translation of the Written Opinion dated Sep. 25, 2012 for corresponding International Application No. PCT/EP2011/054495, filed on Mar. 23, 2011.

* cited by examiner

*Primary Examiner* — Alex Gofman
*Assistant Examiner* — Umar Mian
(74) *Attorney, Agent, or Firm* — David D. Brush; Westman, Champlin & Koelher, P.A.

(57) ABSTRACT

A method and apparatus are provided for preparing a data converter between a source apparatus, in which source data items have been stored according to a predetermined specification of source representation, and a user apparatus having a specification of user representation for the utilization of user data items. The method includes: setting up a pair of machine-interpretable source and user descriptors respectively, of the source and user specifications of representation respectively; and comparing between the source descriptor and the user descriptor to set up therefrom a block for data interpretation by a machine.

20 Claims, 10 Drawing Sheets

| "User" apparatus item | "Source" apparatus item | Semantic conversion | Syntactic conversion |
|---|---|---|---|
| Speed: French manufacturer's denomination | Speed: English manufacturer's denomination | Miles to kilometres | Binary-to-text conversion |
| 91 | 92 | 93 | 94 |

Fig. 9

DATA CONVERTER

CROSS-REFERENCE TO RELATED APPLICATIONS

This Application is a Section 371 National Stage Application of International Application No. PCT/EP2011/054495, filed Mar. 23, 2011, which is incorporated by reference in its entirety and published as WO 2011/117321 on Sep. 29, 2011, not in English.

STATEMENT REGARDING FEDERALLY SPONSORED RESEARCH OR DEVELOPMENT

None.

THE NAMES OF PARTIES TO A JOINT RESEARCH AGREEMENT

None.

FIELD OF THE DISCLOSURE

The present disclosure relates to the exchange of data between two apparatuses using different data representation formats.

BACKGROUND OF THE DISCLOSURE

Any apparatus that processes data records it in its memory or transmits it in a data representation format that specifies the location of the data in the memory or in the stream considered, its structure and its information content. The representation format must be formalized by a descriptor to enable an external user to access the required data items.

Conventionally, the descriptor is provided in the form of a technical specification type of document. The designer of the software program for the utilization of data in an external apparatus can thus identify the useful data (payload) items and develop associated interface functions to locate them, access them and perform a useful reading, i.e. a reading with an understanding of their content. The designer can thus efficiently penetrate the "world" of the apparatus that is the source of the useful data to then translate it into his own "world", i.e. his own data representation format. Here below in this description, it shall be seen that an apparatus called a data storage apparatus can be the source of data or else the receiver of data. For the simplicity of the description, the examples here below represent the case of a storage apparatus that is a source of data.

There are many possible approaches for solving this problem of conversion of representation formats.

1. Approach Using the Dissemination of Written Specifications

A first "adaptive" type approach leaves the responsibility for the adaptation to the designer of the "external" apparatus that receives and uses the data. All that the designer of the source apparatus does is to give the specification of the data representation to the designer of the user apparatus. Then, from the data representation format thus acquired, the designer of the user apparatus develops an interface driver which enables the processing of data represented in this format. The drawback lies in the fact the user designer must repeat his effort to appropriate the source format as and when this format progresses and develops and must do so for each source apparatus, the data of which he wishes to convert.

2. Approach Using a Standard Format

A second approach, of the type that makes "reference to a standard", provides that the designer of the source apparatus will develop an interface function to transcribe his data into a standard representation format. The designer of the user apparatus for his part develops a function of an interface towards this standard. Apart from the fact that this standard often causes a loss of information, the two designers have to make the effort to appropriate a third-party, standard format and keep their interface function up to date.

3. Approach Making Available a Software Drive

A third, "driver" type, approach provides that the designer of the source apparatus will develop an interface function to directly process the data that he exports. This interface function is packaged in a program executable by the operating system of the user's apparatus. The drawback is that a specific program needs to be developed for each operating system, and that this program must be broadcast towards potential users.

Document EP 0 936 788 A1 teaches a method of format conversion in which the source format is compared with a first set of target formats which a first converter can process. In the event of failure, i.e. if the first set of available formats does not include that of the final destination user, the data items of the source are converted into an intermediate format, constituted by one of the formats of the first set, which can be recognized by a second downstream converter. The data items having the intermediate format are then, in the same way, compared with a second set of formats of the second converter and the process is repeated iteratively for a determined number of times in an attempt to establish a chaining leading to a final conversion into the destination format. A failure is then declared if the process is unsuccessful. The type of teaching presented in the document EP 0 936 788 A1 is that of the second approach i.e. it is a use of standard known formats. In other words, since the formats are "quantified" and fixed, it is impossible to deviate from a standard. This teaching therefore pertains to a use of one or more cascade-connected converters and in no way to the creation of a converter suited to the requirement presented.

SUMMARY

An exemplary embodiment of the present invention seeks to facilitate the adaptation needed between two apparatuses having different formats for the representation of their data.

To this end, an embodiment of the invention relates, first, to a method for preparing a data converter between a source apparatus, in which source data items have been stored according to a predetermined specification of source representation and a user apparatus having a specification of user representation for the utilization of user data items, a method characterized by the fact that:

a pair of machine-interpretable, source and user descriptors respectively of the source and user specifications of representation respectively are set up, and a comparison is made between the source descriptor and the user descriptor to determine therefrom a mutual discordance used for setting up an interpretation block for data interpretation by a machine, comprising means for controlling a conversion between homologous data elements of the source descriptor and user descriptor respectively.

Thus, one of the apparatuses "introduces itself" to the other, i.e. its own descriptor is made available. The above discordance can, by way of an example and non-exhaustively, relate to at least one of the elements of a group comprising semantic information items, syntactic information items, structural information items and information items on inclusion relationships.

As compared with the document referred to here above, an embodiment of the invention offers failsafe operation since the interpretation block makes it possible at the outset to compensate for the mutual discordance and does so without any need for a cascade of sets of converters or even a first set of converters, since the interpretation block ensures the necessary adaptation or upgrading. This adaptation is therefore not a search for a converter that would be suitable but the direct creation of an appropriate conversion tool.

One original feature of the method of an embodiment of the invention is that it is possible to do without a human operator to put two new apparatuses into a relationship since the descriptors are machine-interpretable.

Another original feature lies in the fact that, as compared with the second case mentioned here above of an approach using standards or norms, the third-party reference is located only at the level of the descriptors concerned and in no way at the level of the representation format of the data to be converted. The reference at the level of the data is related to the field of application of the data considered—there is a standard for each field—but the reference at the level of the descriptor pertains solely to the field of the application of the data conversion—it is possible to create a single standard. It is thus possible to link up two disparate worlds by a volume of communication located on both sides of their boundary and capable of setting up an intermingling (cross-exchange) of relationships which will enable the comparison between the two descriptors and the building of a transformation method.

The descriptor made available is therefore a didactic element enabling the "recognition" of the connected apparatus and making it possible to follow any changes in its characteristics in order to carry out the desired adaptation.

The steps of the method can be performed entirely or partly in either of the apparatuses or even in another apparatus serving as a tool.

In a first case, and assuming that the data items are effectively transferred in the context of the following method of data of transfer according to an embodiment of the invention, using the present method for elaborating a converter, the source apparatus, upon request or else spontaneously, sends out the data, these pieces of data remaining presented according to the source format. A mode of functioning of this kind can be called a high-level PUSH, i.e. the source apparatus does not take account of the specific characteristics of the user apparatus: it exports its data into its native mode and "on the side", it specifies their structure, their syntax and the associated semantics. The source apparatus therefore intervenes only at the start of the method of elaboration of the converter, only to give its own descriptor and the content of its data. The remainder of the steps of the method for preparing a converter will therefore be performed in furthermore using the user representation specification.

However, it cannot be ruled out that, since the converter is a tool, in order to make the data exploitable by the user, the user apparatus may forgo the possibility of exploiting all or part of this tool and transfer its descriptor to the source apparatus which will therefore be responsible for using it during the data conversion The second case is dual or dyadic to the first case, i.e. it is the source apparatus that processes the steps of the method for elaborating a converter and then uses this tool and, as the case may be, transfers it to the user apparatus.

In either case, during the elaboration of the converter, each apparatus is the master since its descriptor comes into action during the elaboration of the converter. This is therefore a double command.

On the contrary, during the transmission of the data according to the data transfer method of an embodiment of the invention, the user apparatus will be enslaved in the first case since it will use a converter that depends on the source apparatus. The source apparatus will however be only a virtual master, since it intervenes only at the upstream level, the level for elaborating the tool constituted by the converter, and not at all at the downstream level, the level at which this tool is used to transmit the data.

Preferably, the interpretation block is made by setting up and integrating therein:
  a first block for controlling the reading of the source data elements by interpreting information items, on their structure, contained in the source descriptor,
  a second block, belonging to said means for controlling a conversion between homologous data elements, by mutually bringing closer semantic and/or syntactic pieces of information contained in said descriptors of said specifications, and
  a third block for controlling the writing of the converted data elements by interpretation of information items, relating to their structure, contained in the user descriptor.

The second conversion block between said format descriptors therefore serves as an adaptor pivot between the reading on the source side and the writing on the user side.

If necessary, downstream from the interpretation block, a parameter conversion table is set up.

The conversion table links together the homologous data elements in the two apparatuses. The conversion table sets down a set of parameters specific to the data items and especially denominations of the data elements, their memory addresses and semantic and syntactic algorithms needed for their conversion.

It is convenient that, in order to bring closer the semantic information items, a semantic graph should be set up to represent a link between two thesauruses of respectively for the source apparatus and the user apparatus.

Thus, a tree is set up in which it is possible to plot a route in order to find a path going from one data element of one of the apparatuses to an identical data element located in the other apparatus. For example, the speed of the vehicle can be designated by the "car_speed" designation in one apparatus and by the "vitesse_véhicule" designation in the other apparatus. The semantic graph will enable a path to be set up between the two terms and to characterize this link.

In such a case, preferably, according to the semantic graph, a semantic level conversion algorithm is set up and integrated into the interpretation block.

The algorithm is a simple equality when the terms are equivalent but it can be more elaborate. For example, if the data element "car_speed" can be expressed in "miles per hour" then the data element "vitesse_véhicule" can be expressed in kilometers per hour, and the conversion algorithm will consist of a multiplication factor.

Thus, generally, the semantic graph enables the search, through the use of a software program, for equivalent terms or terms of a same origin.

Advantageously, a structural scheme of the source data is set up in order be used for preparing the interpretation block.

The structural scheme thus makes it possible to localize a data element to extract source data therefrom and then interpret and convert its syntax to write it in the user data.

Preferably, on the basis of a pair of respective structural schemes of the source apparatus and user apparatus respectively, a syntactic level conversion algorithm is set up and integrated into the interpretation block.

For example, if the data element "car_speed" is encoded in "pure" binary format, whereas the data element "vitesse_véhicule" is encoded in text format, then the conversion algorithm will consist of a binary-to-text transformation.

An embodiment of the invention also relates to a method of data transfer between a source apparatus and a user apparatus, characterized by the fact that:

- a data converter is elaborated by means of the method, according to an embodiment of the invention, for preparing a data converter,
- a connection is set up between the source apparatus and the user apparatus, and
- the data is transferred with a conversion by means of said data converter.

As referred to here-above, the transfer can take place following a read request sent out by the user apparatus or it can be a spontaneous broadcast of the data.

Advantageously, at least a part of the steps of the data transfer method is performed in a front logic block of the source apparatus and/or a front logic block of the user apparatus.

An embodiment of the invention also relates to an application of the data conversion method wherein the data of a motor vehicle local area network is accessed.

For example, a universal portable tester can thus access a bus of the local area network of an automobile vehicle to read certain data items or reciprocally to write new data items at suitable locations and according to suitable formats and can do so whatever the model or brand of the vehicle.

According to another example, a nomad apparatus can retrieve data on the fuel gauge level, speed or position of the driving wheel coming from the local area network of the automobile to improve its software applications by means of GPS-aided driving and navigation.

It will be noted that, in this application and in others, the data transfer link can be of any physical nature whatsoever, for example wire, optical, radio, short range by transponder etc.

An embodiment of the invention also relates to an application of the data conversion method in which a reader item, for reading an identification means, for example a badge, carries out a recognition of a content of the identification means through a conversion according to said method.

The reader is thus universal in that it can read badges in various data formats and with various storage architectures.

An embodiment of the invention also relates to an application of the data transfer method wherein an apparatus which is a source of remote control commands transmits a remote control command to a user apparatus, the transmitted remote control command being converted by the data converter in order to be usable.

The remote control user apparatus is thus universal. It can control any type of apparatus, for example a home apparatus or an industrial apparatus.

Home apparatuses for example may include television sets of various types, hi-fi systems, ovens, dishwashers, clothes-washing machines, air conditioners as well as door or shutter handling devices. Industrial apparatuses may include for example speed variators or programming automatons.

An embodiment of the invention also relates to equipment for implementing the method for elaborating a data converter comprising:

- means for storing a pair of machine-interpretable descriptors, a source and a user descriptor respectively, of the source and user specifications respectively, and
- comparator means arranged for achieving a comparison between the source descriptor and the user descriptor and to determine a mutual discordance therefrom used for setting up a block for the conversion of data by a machine, comprising means for controlling a conversion between homologous data elements of the source descriptor and the user descriptor respectively.

Advantageously, the equipment comprises correlation means arranged for establishing a said semantic graph and an algorithm for semantic level and/or syntactic level conversion.

An embodiment of the invention also relates to a computer program product downloadable through a communications network and/or recorded on a computer-readable medium and/or executable by a processor, characterized by the fact that it comprises program code instructions to implement the method for elaborating a data converter when said program is executed by computer.

An embodiment of the invention also relates to a computer-readable data storage medium storing a computer program comprising a set of instructions, which can be run on a computer, to implement the method for elaborating a data converter.

One or more embodiments of the invention will be understood more clearly from the following description of various variants of the present inventive concept, namely the method for elaborating a data converter, the data transfer method which uses an application of this method in a network embedded in an automobile, the equipment for implementing the data converter elaboration method, computer software products and data storage means pertaining to one or to the other of the methods of embodiments of the invention.

BRIEF DESCRIPTION OF THE DRAWINGS

This description is made with reference to the appended drawings of which:

FIG. 9 represents an extract of a conversion table for two homologous data elements.

DETAILED DESCRIPTION OF ILLUSTRATIVE EMBODIMENTS

Figure 1:
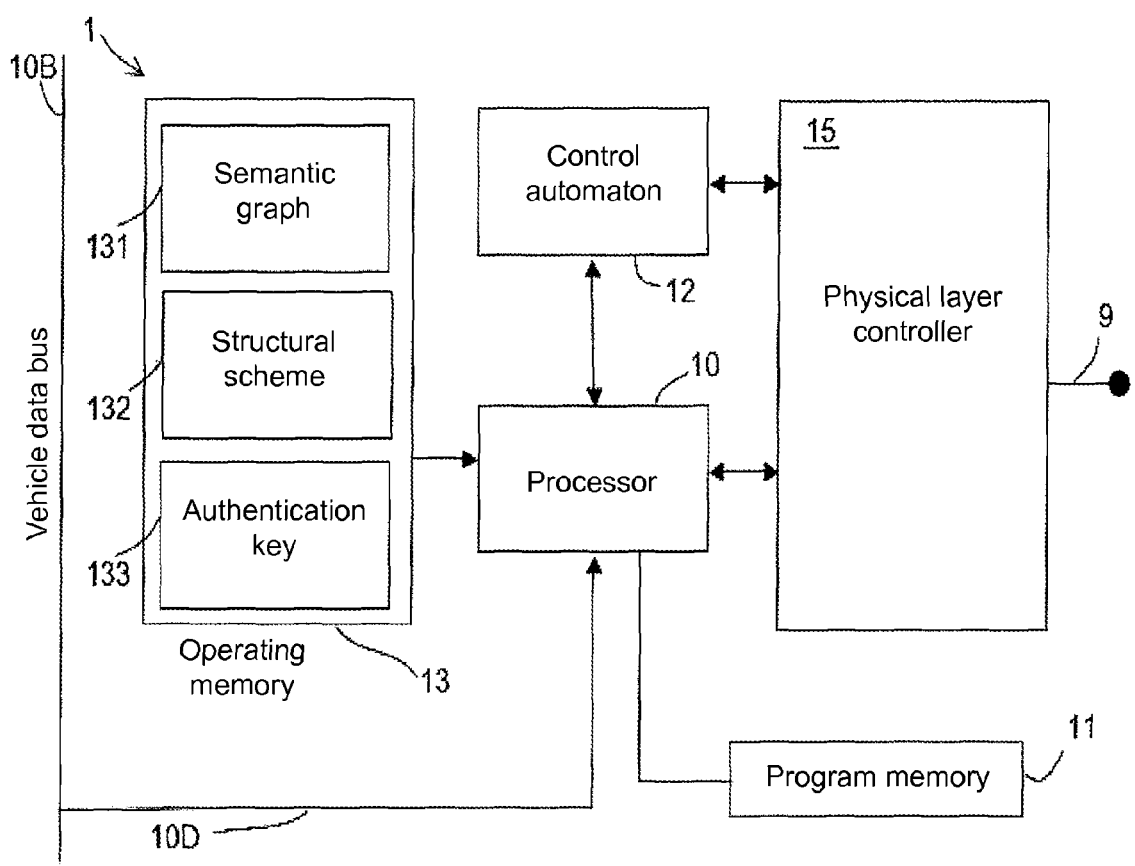
FIG. 1 is a block diagram of the needed components, according to an embodiment of the invention, of a data source apparatus.

FIG. 1 represents a data source apparatus 1 comprising a processor 10 driven by a memory program 11 and by a control automaton 12. The processor 10 is connected to an operating memory 13 comprising a memory zone 131 for a semantic graph, a memory zone 132 for a structural scheme and, in this example, a memory zone 133 for an authentication key.

The processor 10 is connected at input to an internal data link 10D, in this case for access to a data bus 10B constituting the skeleton of a vehicle local area network and is connected to an external data link 9 through a port of a physical layer controller 15 also connected to the control automaton 12.

Figure 2:
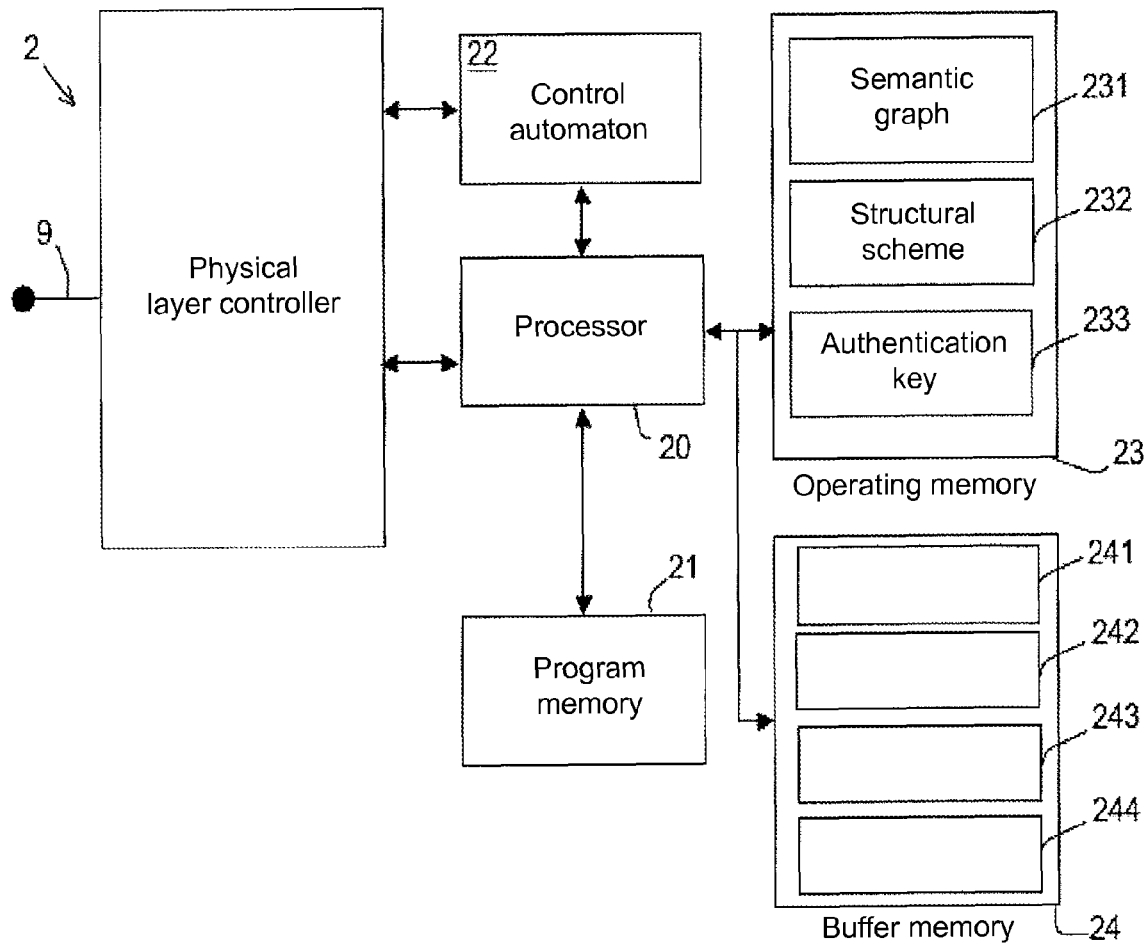
FIG. 2 is a block diagram of the needed components, according to an embodiment of the invention, of a data user apparatus.

FIG. 2 represents a data user apparatus 2 comprising a processor 20 driven by a memory program 21 and associated with a control automaton 22. The processor 20 is connected to an operating memory 23 which contains a memory zone 231 for a semantic graph, a memory zone 232 for a structural scheme and a memory zone 233 for an authentication key. A buffer memory 24 connected to the processor 20 comprises a memory zone 241 for denominations of homologous elements, a memory zone 242 for their respective addressing, a memory zone 243 for a semantic level algorithm which links them together and a memory zone 244 for a syntactic level algorithm which links them together.

The processor 20 is connected at input to the external data link 9 through a physical layer controller 25 also connected to the control automaton 22.

Figure 3:
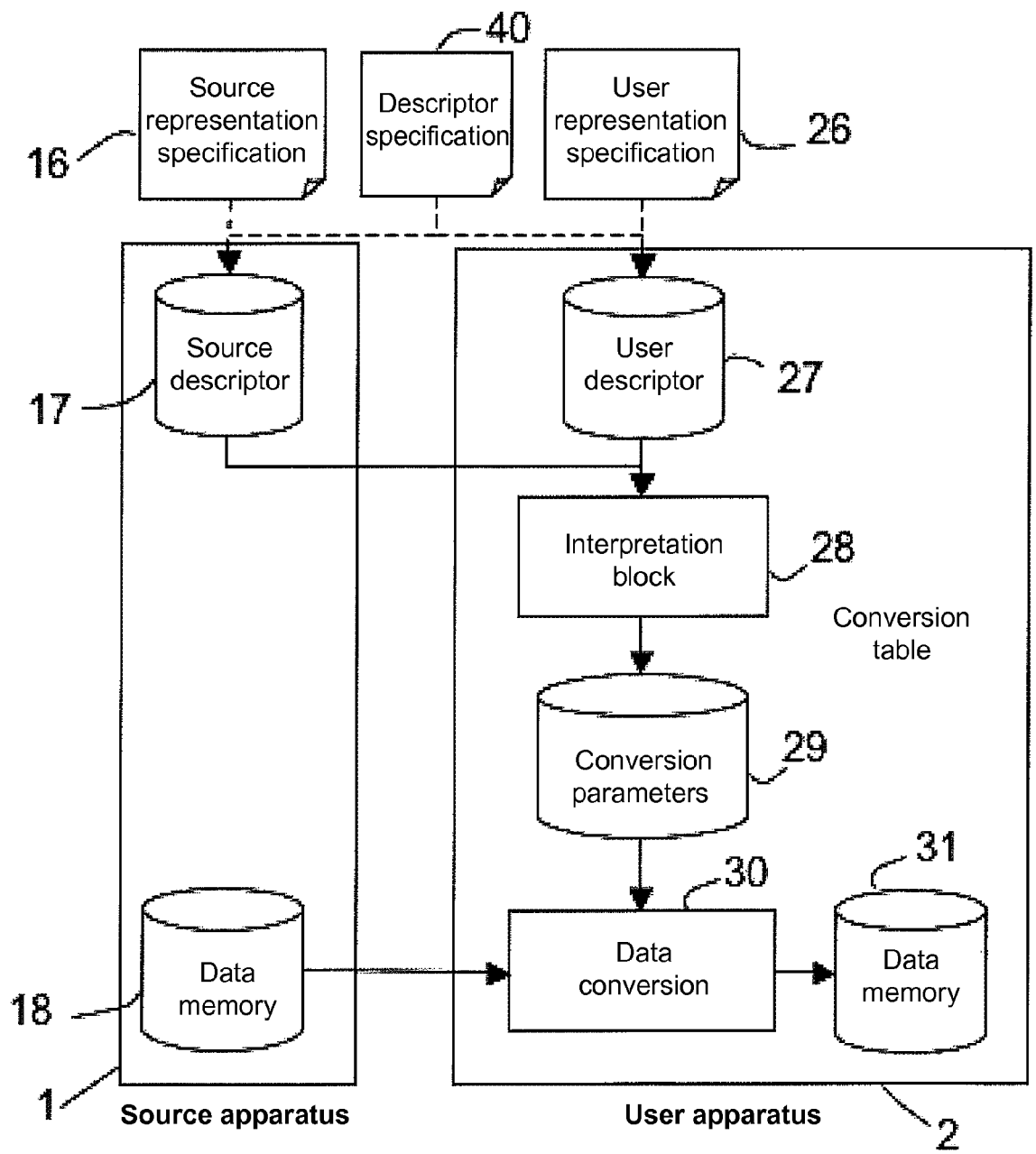
FIG. 3 is a block diagram of the logic functional blocks of these two apparatuses, which collaborate to enable data transfer from one to the other, with a conversion according to an embodiment of the invention, making them usable.

FIG. 3 illustrates functional blocks whose cooperation enables the conversion of the data exchanged on the link 9, by establishing a didactic connection according to an embodiment of the invention. The source apparatus 1 has an associated source representation specification 16 in the form of a document written in "human" language which enables the setting up of a source descriptor 17, in electronic form, of the data representation format sent out on the link 9. Symmetrically, the user apparatus 2 is associated with a user representation specification 26 in a form of a document written in "human" language which enables the setting up of an electronic user descriptor 27 of the data format that the user apparatus 2 is capable of processing. The reference 40 designates a descriptor specification indicating that the source descriptor 17 and the user descriptor 27 are compliant therewith, i.e. are mutually comprehensible so that they can be compared.

The source descriptor 17 and the user descriptor 27 are machine-interpretable, so that a comparison of these two descriptors leads to the elaboration of an interpretation unit 28 which builds the method of transformation between the two specifications 16, 26. In this example, an embodiment of the invention furthermore establishes a block of conversion parameters in the form of a conversion table 29. With the conversion table 29 established, the conversion elements here required are thus available to prepare a data converter 30 linking a source data (raw data) memory 18 of the source apparatus 1, linked to the internal link 10D, to a data memory 31 of the user apparatus 2.

The above comparison operations are a kind of a higher-level shuffling, or intermingling, operation, i.e. a physical and mainly logic operation going from the user descriptor 27 to the source descriptor 17 or vice versa depending on whether operations for setting up the data converter 30 are done by the user apparatus 2 or by the source apparatus 1. This intermingling operation is done according to the differences or correlations between the descriptors 17 and 27 perceived through the machine-interpretable didactics of the source descriptor 17. The didactically commanded shuffling enables the user apparatus 2 to search for the desired conversion information in the source descriptor 17 and thus create the conversion tool for the adaptation between these two. In other words, the user descriptor 17, upgraded by the data converter 30, is an emulator of the source apparatus 1.

This comparison is made by the processor 20, i.e. it is the apparatus 2, requesting the data, which takes responsibility for consulting the instructions for use of the source apparatus 1 represented by the source descriptor 17 which is made available to potential users. As indicated here above, the inverse approach is possible, where the user apparatus 2 makes its descriptor 27 available and requests that it should be the source apparatus 1 that creates the data converter 30. More generally, the tool constituted by the data converter 30 may be elaborated by any apparatus whatsoever that has interpreted the two descriptors 17, 27 and this tool is then provided to one of the two apparatuses 1, 2 to carry out the desired conversion on the data, either when sending or when receiving.

Figure 4:
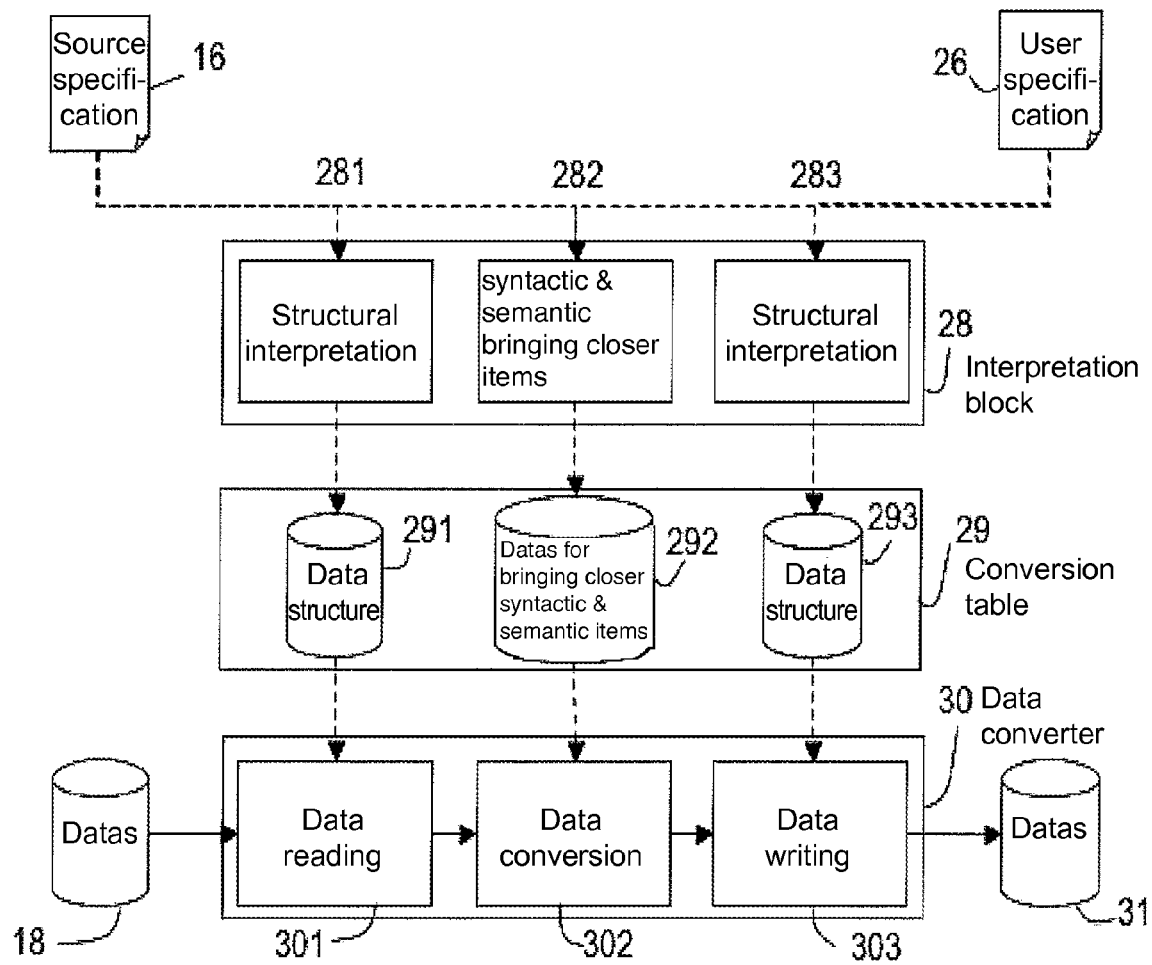
FIG. 4 is a partial, more detailed, drawing illustrating functional blocks used for the conversion.

FIG. 4 gives a detailed view of the blocks 28, 29 and 30.

The interpretation block 28 comprises three entities, namely an entity 281 for structural interpretation of the descriptor 17 of the source apparatus 1, i.e. for commanding the reading of the relevant data zones, an entity 282 for bringing closer semantic and syntactic items between the two apparatuses 1, 2, i.e. providing an appropriate conversion command, and an entity 283 for structural interpretation of the descriptor 27 of the user apparatus 2, i.e. to control the writing in appropriate zones.

In a homologous way, the conversion table 29 has three entities, namely a structural data entity 291 for the source apparatus 1, an entity 292 containing data for bringing closer semantic and syntactic items for the two apparatuses 1, 2 and a structural data entity 293 for the user apparatus 2.

The data converter 30 similarly has three entities, namely an entity 301 for reading data in the data memory 18 of the source apparatus 1, an entity 302 for converting exchange data and an entity 303 for writing converted data into a data memory 31 of the user apparatus 2, these entities 301, 302, 303 being under the control of the respective entities 281, 282, 283.

1. Operation

The didactic connection is set up in three phases.

A first phase corresponds to the initialization of the connection, the source apparatus 1 transferring the source descriptor 17 to the user apparatus 2 after, possibly, an identification of the user apparatus 2 by the source apparatus 1, i.e. an authentication.

A second phase relates to the preparation of the conversion table 29 a phase in which the source descriptor 17 is analyzed by the user apparatus 2 to derive the required useful data therefrom and to derive the content of the conversion table 29 therefrom.

A third operating phase comprises the reading of the desired useful data by extraction, from the source data, coming from the source apparatus 1, after the addressing of the relevant memory zone localized by means of the second phase. This third phase also comprises the conversion of this useful data as well as its writing in the user memory zone of the source apparatus 2.

Figure 5:
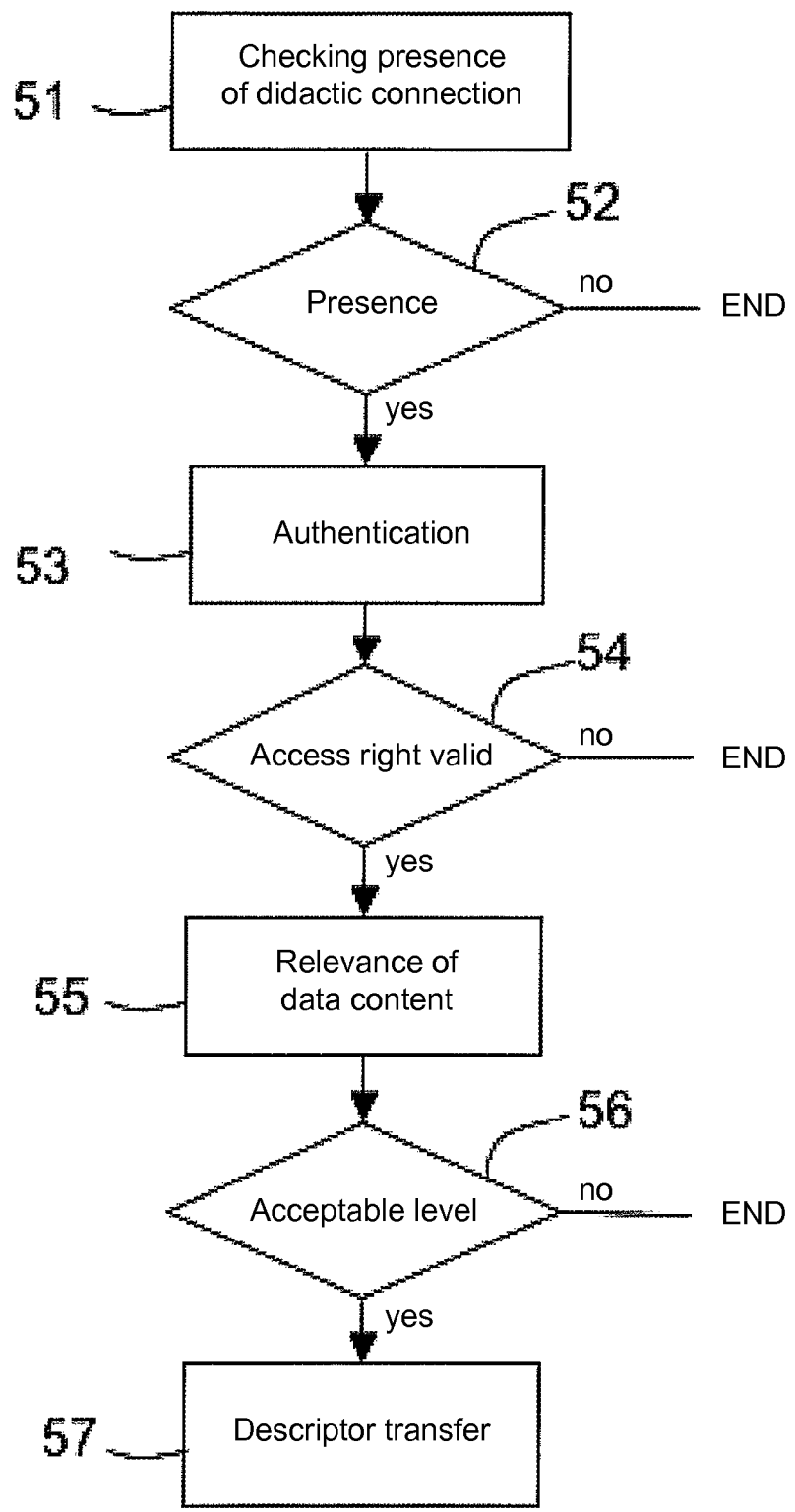
FIG. 5 is a flowchart indicating steps for initializing a logical connection, under the assumption that the data are converted after their transfer.

For the first phase, FIG. 5 is a flowchart explaining steps for initializing the logic connection through the link 9. After the link 9 has been set up at the physical level, a check is made on identifiers of the communications protocol which can be found for example in the source descriptor 17. The source descriptor 17 is accessible from, or even integrated into, the controller 15 which manages the physical layer of the port of the link 9 in order to verify that the source apparatus 1 is equipped with the didactic connection. Finally, it can be checked that the user apparatus 2 can link up the semantic graph 231 of its data with the semantic graph 131 of the source apparatus 1, the references of which may figure in the source descriptor 17. This is therefore a comparison to verify the existence of a minimum degree of concordance. It can be planned that the didactic connection will enable the acquisition of an external semantic graph by downloading.

Thus, a functional block 51 represents the starting point for assessing the situation, i.e. searching for the presence of the above elements used as tools to read and convert the data at a step 52. In all the steps of the figures comprising a test, a negative response stops the process. If the response is positive at the step 52, the process passes to a step 53 of authentication of the user apparatus 2 for which, at a step 54, a check is made to know if a user apparatus 2 has transmitted the needed data to validate its right of access to the source apparatus 1 and especially to the data that it contains. If this the case, at a step 55, the relevance of the content of the source data items will be examined to determine, at a step 56, if they have an acceptable level of interest and then the source descriptor 17 will be transferred, at step 57, to the user apparatus 2.

Figure 6:
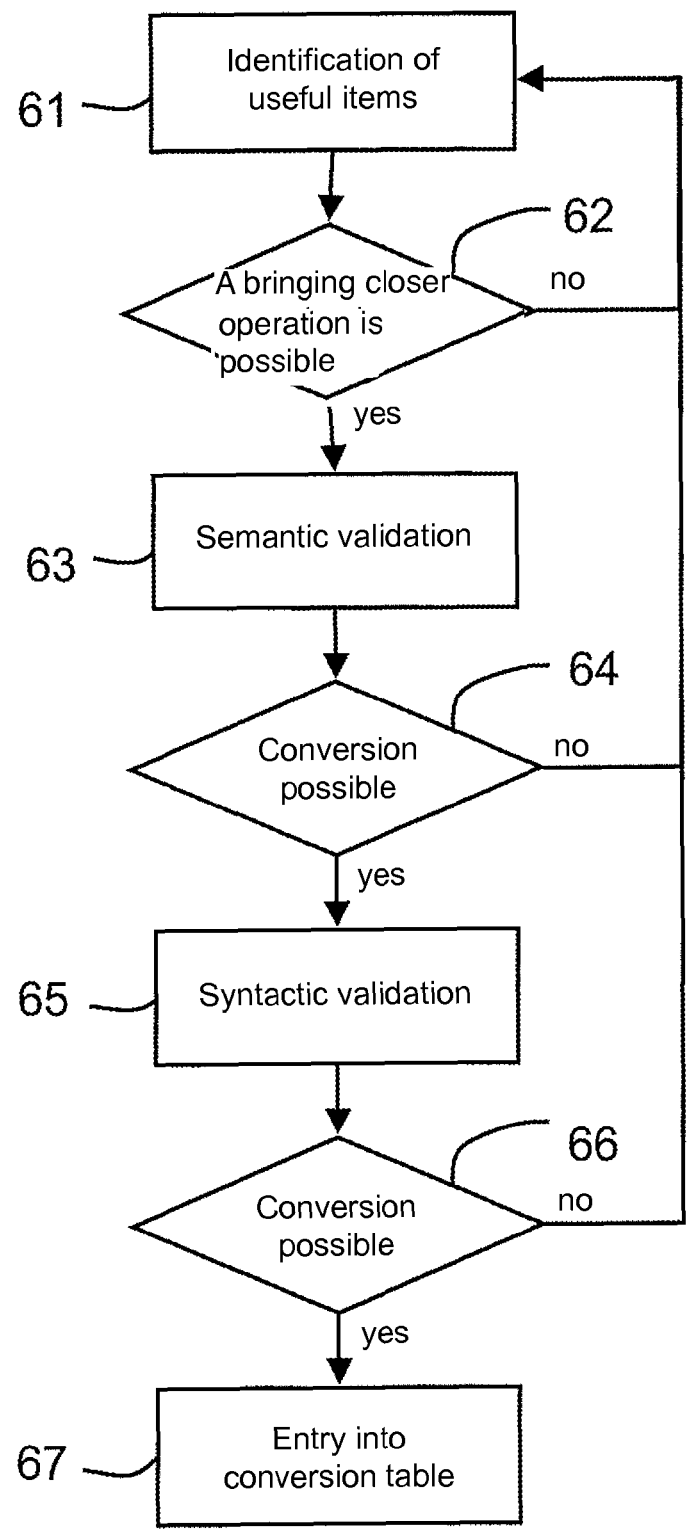
FIG. 6 is a flowchart illustrating a sequence of preparation of a conversion table.

For the second phase, FIG. 6 is a flowchart illustrating the continuation of the steps of FIG. 5, i.e. a sequence for preparing the conversion table 29. The didactic connection travels through the source semantic graph for mutually bringing closer the denominations of the data elements which are present in the semantic graph 231 of the user apparatus 2, with those of the data elements which are present in the semantic graph 131 of the source apparatus 1. If a "bringing closer" operation having a level above a minimum threshold can be made, then the didactic connection sets down the two said denominations to be brought closer in the conversion table 29. From the source and user semantic graphs 131, 231, and from the source and user structural schemes 132, 232, the didactic connection derives the associated conversion algorithms 243, 244 of a semantic and syntactic level respectively, and sets them down in the conversion table 29.

Thus, an initial step 61 relates to the identification of the elements useful to the user apparatus 2, i.e. the denominations of the elements which are sought. At a following step 62, an examination is started to determine if it is possible to mutually bring closer a denomination belonging to the semantic graph 231 of the user apparatus 2 and a denomination belonging to the semantic graph 131 of the source apparatus 1. If this is the case, a semantic validation is started at a step 63 to determine, at a step 64, whether a conversion is possible. If the answer is affirmative, a syntactic validation is started at a step 65 to examine, at the step 66, whether a conversion is possible. If this is so, the operation passes to an entry step 67, for entering the conversion table 25 thus prepared into the buffer memory 24.

Figure 7:
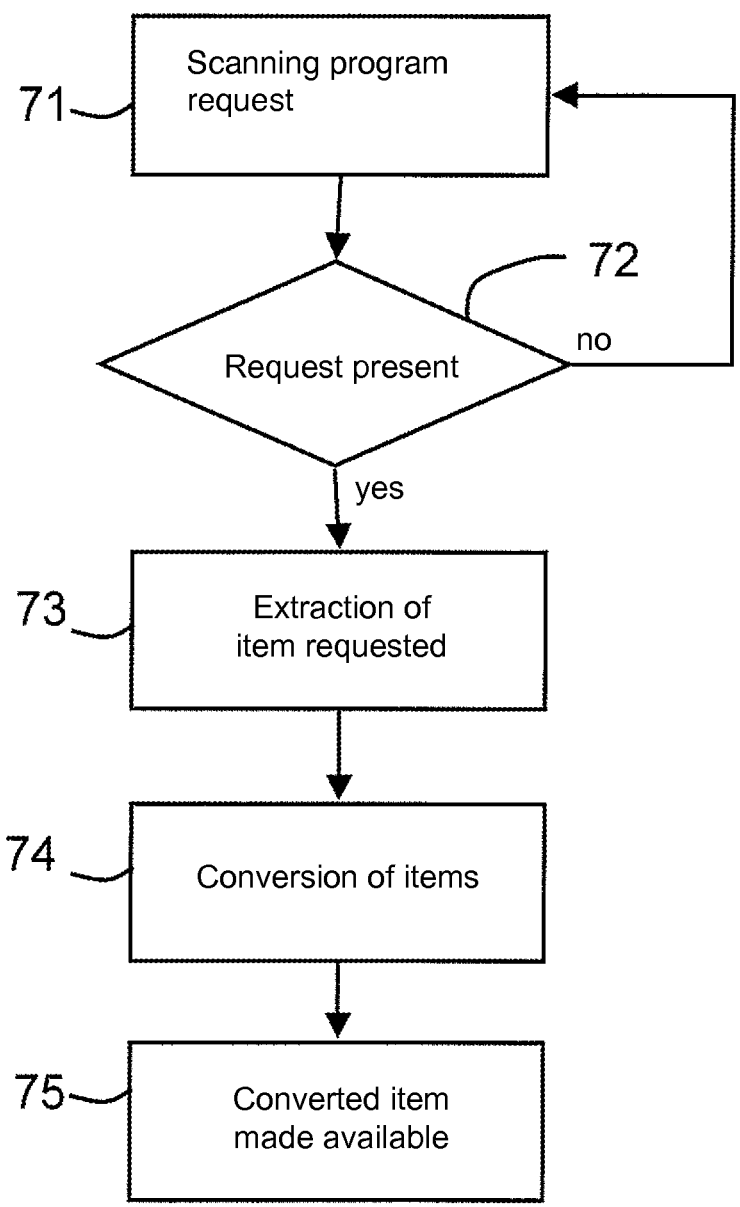
FIG. 7 is a flowchart illustrating steps for making a converted data element available.

For the third phase, FIG. 7 is a flowchart illustrating steps for making available a said converted data element, i.e. the useful data. The didactic connection extracts, from the source structural scheme 132, starting and ending addresses of a memory zone of the required piece of data to read and convert it.

Thus, an initial step 71 starts a checking of the program in memory 21 so as to detect, at a step 72, the presence of a request for making a converted data element available. If the answer is positive, the element considered is extracted, at a step 73, in the required zone of the source data memory 18 and, at a step 75, it is converted by means of the data converter 30 so that it is stored in the data memory 31.

2. Functional Architecture of the Didactic Connection

The didactic connection is formed by two parties, distributed among the two apparatuses 1 and 2.

The connection initializing function is herein allocated as follows: The source apparatus 1 makes available the means for identifying the connection and performs the functions of authentication at the controller 15. The user apparatus 2 verifies the presence of the didactic connection and provides the authentication code words. The function of preparing the conversion table 29 is allocated as follows: The source apparatus 1 makes available the source descriptor 17 of the source data. The user apparatus 2 downloads the source descriptor 1 and, for each useful and convertible data element, derives, from the source descriptor 17, the conversion parameters which will complement the conversion table 29 with the structural, syntactic and semantic data items thus collected.

The data extraction function is allocated as follows: the source apparatus 1 transmits, as such, the content of the source data memory containing the raw source data, and it refreshes its transmission at required intervals when the source data corresponds to a data stream. The user apparatus 2 extracts and converts all the useful data elements by the method of an embodiment of the invention and it can also process only those elements that are the object of a request coming from the program memory 21.

3. Architecture of the Source Apparatus 1

The didactic connection is represented in the source apparatus 1 by the following functions:

making available parameters of the exchange protocol, i.e. an identifier of the connection and an authentication key 133, transmitting the source transmitter 17 containing the source semantic graph 131 and the source structural scheme 132, and transmitting the content of the source data memory 18 containing the source data to be broadcast.

A source manager controller manages the sequences for making available the information. A processor reformats the data items therein for their transfer to the physical layer controller 15, and the physical layer controller 15 can coincide, as the case may be, with the source manager controller. The controller 15 can be made responsible for making the source descriptor 17 available and for managing the authentication functions, i.e. serving as a front unit. The source apparatus 1 integrates the needed memory means (13) for storing the source descriptor 17 as well as those (18) needed for transmitting the source data.

4. Architecture of the User Apparatus 2

The didactic connection is represented in the user apparatus 2 by the following functions:

verifying the presence of the didactic connection, verifying possibly, at the level of the semantic graph 31 and supplying authentication code words, downloading the source descriptor 17, identifying the useful data elements and initializing the conversion table 29 by means of the conversion parameters collected, simultaneous or sequential extraction of all the useful data elements.

The user apparatus 2 therefore has the required memory means (23) for storing the parameters of the exchange protocol and the user descriptor 27 and the means (24) required for storing the conversion table 29. The processor 20 has predefined routines covering a majority of conversion cases. It sets up these routines on the basis of the conversion table 29 and, if necessary, complements them with the conversion parameters that conversion table 29 contains. The processor 20 thus executes the conversion routines, such as decompression, truncation, on elements coming from the source data and makes available the result in the data memory 31. For the conversions, the controller 25 sends the processor 20 conversion instructions associated with the extracted piece of data. The processor 20 thus executes conversion routines such as decompression, truncation etc and makes the result available in the data memory 31. The reading and conversion function is associated with a software application program using the data made available.

5. Access to a Messaging System

This is an application of an embodiment of the invention providing a function of scanning the messaging system of a data bus, in this case of an automobile vehicle, in order to feed a knowledge base of a portable GPS navigation apparatus. A didactic connection with which this apparatus is equipped thus avoids the need for developing a plurality of specific drivers suited to each model of each brand of automobile. It can thus be planned to have an interface module equipped with the didactic connection to make messaging frames of the vehicle, as well as data from the embedded network, available to the source descriptor 17. The apparatus, which is a GPS navigation nomad apparatus, can then link up to the interface module by means of a physical link, for example of a USB type or else a short-range wireless link.

Initially, a thesaurus of the content of the messaging system of the vehicle is described in a semantic graph where it is attached to one or more generic thesauruses. The file of the source semantic graph 131 can be integrated within the above module or else referenced in a descriptor of the module.

Then, the structure of each frame (FIG. 10) is described in a structural scheme 132. Each of the frames is recognized in a continuous flow by an identifier located in the structural scheme, along with the exact location and the syntax of each data element that the frame contains.

Finally, a USB controller is configured so as to choose a transmission mode well suited to the sending of files in an interpretable language.

The semantic graph 131 and the structural scheme 132 thus constituted are recorded in the descriptor of the interface module of the vehicle. The navigation apparatus contains a descriptor in which the data useful to it are attached to a generic thesaurus of the automobile messaging system in a semantic graph 231.

Figure 8:
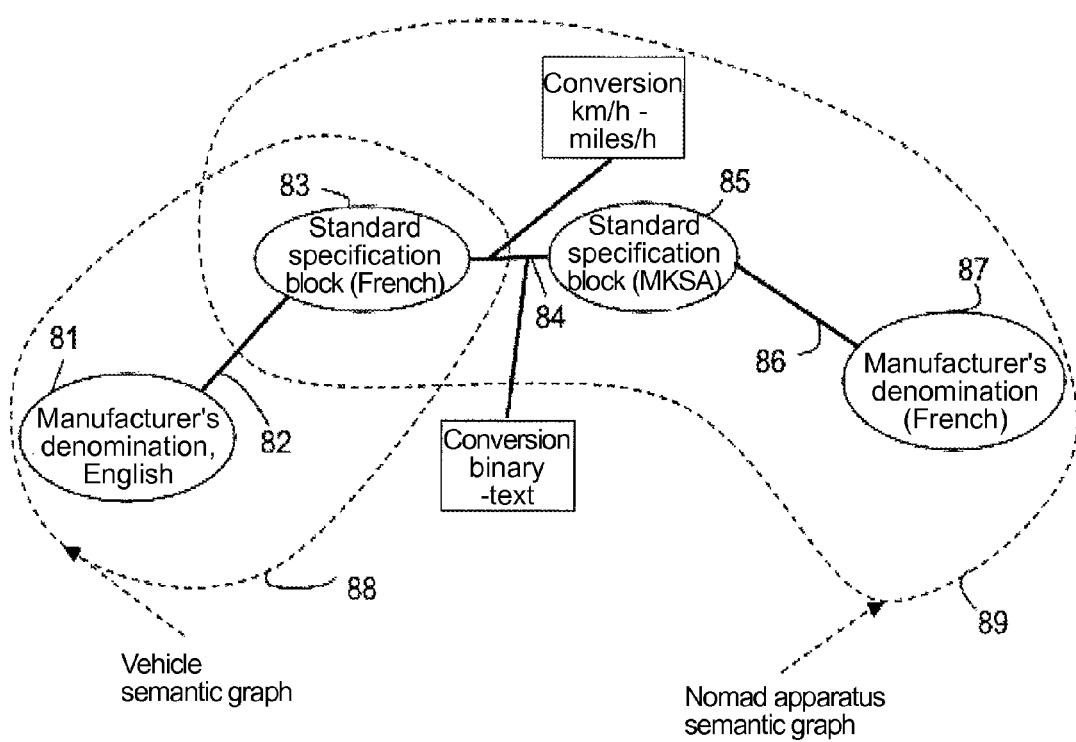
FIG. 8 is a semantic graph corresponding to a messaging system ontology in an embedded network of an automobile.

FIG. 8 represents an ontology of a messaging system in the embedded network of the automobile vehicle. This ontology is described by two distinct semantic graphs, namely a vehicle semantic graph 88 and a nomad apparatus semantic graph 89, possessing a common element or individual.

In the graph 88, a block 81 represents data which, according to a specific format, specifies information items on particular speed denominations, associated with corresponding measurements (not shown in FIG. 8) which the automobile manufacturer has expressed in English traditional units, i.e. miles per hour. The block 81 is an individual with an ontology for a vehicle local area network bus according to a manufacturer's specification, in this case an English manufacturer's specification. Through an equality link 82, the block 81 controls a block 83 for a source standard specification, also English, of this particular speed denomination, and said block 83 is still associated with the same measurements expressed in said unchanged English units. Through a link conditioned by conversion 84, the source standard specification block 83 controls a speed standard denomination block 85, in this case a French block which is the equivalent of the block 83 for French terms. The user standard denomination block 85 is associated (not shown in FIG. 8) with the converted speed measurement value expressed in MKSA units i.e. in km/hour.

The user's standard denomination speed block 85, working through an equality link 86, controls a block 87 which is an individual among an ontology (graph 89) for a bus of a French-language manufacturer. The interface module of the vehicle contains the semantic graph 88 covering the blocks 81 and 83 while the semantic graph 89 of the GPS portable navigation apparatus contains the blocks 83, 85 and 87. The method of an embodiment of the invention makes it possible to mutually bring closer the useful data elements for the apparatus in the module through the existence, in the two graphs 88, 89, of the source standard specification block 83 of the speed denomination specification.

FIG. 9 provides an example of a part of the conversion table 29 relating to the speed data denomination element presented in FIG. 8. Functional blocks 91, 92 contain denominations of the data element respectively for the user apparatus 2 (speed, in metric units) and for the source apparatus 1 (speed, but in traditional English units). A functional block 93 contains the algorithm for semantic conversion from miles into kilometers. A functional block 94 contains the algorithm for binary-to-text syntax conversion.

Figure 10:
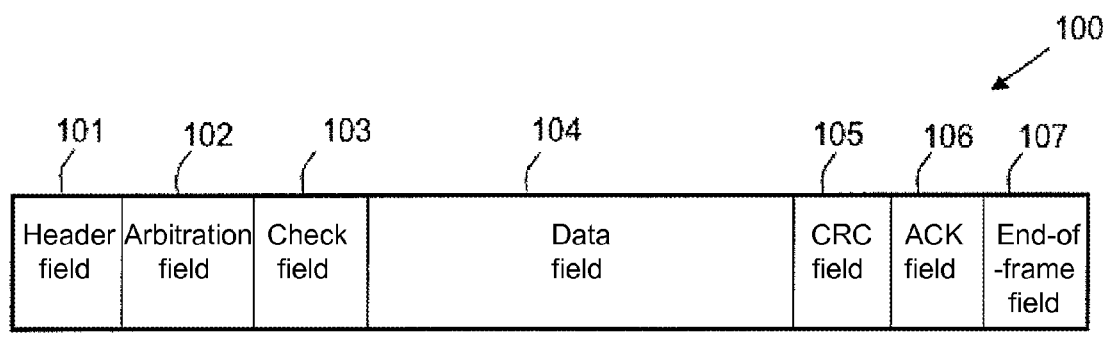
FIG. 10 represents the structure of a data frame coming from a local area network of a vehicle.

FIG. 10 represents a packet or frame 100 for transporting a said data element. The frame 100 has a header field 101, containing a specific pattern, for recognition of the frame 100, followed by an arbitration field 102, containing a frame identifier, which is itself followed by a control field 103. The packet then has a useful data (payload) field 104 for the content of the data element which, for example, may be a number ranging from 0 to 180 for a speed expressed in km/hour. This field is followed by a CRC field 105 and then an acknowledgement field (ACK) and a frame-end field.

Although the present disclosure has been described with reference to one or more examples, workers skilled in the art will recognize that changes may be made in form and detail without departing from the scope of the disclosure and/or the appended claims.

The invention claimed is:

1. A method for preparing a data converter between a source apparatus, in which source data items have been stored according to a predetermined specification of source representation and a user apparatus having a specification of user representation for utilization of user data items, wherein said source data items and said user data items are encoded using different encoding formats, the method comprising the following steps, all steps being performed using at least one processor:

an initial step of providing a pair of machine-interpretable source and user descriptors of the source and user specifications of representation, respectively, said source descriptor comprising at least a reference of a first semantic graph representing a first thesaurus of said source apparatus, and said user descriptor comprising at least a reference of a second semantic graph representing a second thesaurus of said user apparatus;

detecting a presence of a connection between the source apparatus and the user apparatus;

in response to the presence of the connection, transferring the machine-interpretable source descriptor from the source apparatus to the user apparatus, or transferring the machine-interpretable user descriptor from the user apparatus to the source apparatus;

comparing the source descriptor and the user descriptor to determine therefrom at least one discordance, using the at least one discordance, in combination with said first and second semantic graphs of respectively said source and said user descriptors, to set up a machine-interpretation block to control a conversion by said data converter between homologous data elements of the source descriptor and the user descriptor respectively; and using the machine-interpretation block to perform the conversion on at least one of the homologus data elements.

2. The method according to claim 1, wherein the step of using the at least one discordance to set up the machine-interpretation block comprises setting up and integrating therein:
- a first block, for controlling reading of the source data items by interpreting information relating to their structure, which information is contained in the source descriptor,
- a second block matching semantic and/or syntactic pieces of information contained in said descriptors of the specifications, and
- a third block, for controlling writing of the converted data elements by interpretation of information relating to their structure, which information is contained in the user descriptor.

3. The method according to claim 1, wherein the method comprises setting up a parameter conversion table after setting up said block.

4. The method according to claim 1, further comprising setting up a structural scheme of the source data for use in preparing the block.

5. The method according to claim 2, further comprising, in order to match the semantic pieces of information, setting up the first and second semantic graphs to represent a link between first and second thesauruses of respectively the source apparatus and the user apparatus.

6. The method according to claim 5, further comprising setting up, according to the semantic graphs, a semantic level conversion algorithm, which is integrated into the block.

7. The method according to claim 1, further comprising setting up, on the basis of a pair of respective structural schemes of the source apparatus and user apparatus respectively, a syntactic level conversion algorithm, which is integrated into the block.

8. The method of claim 1, further comprising:
- setting up the connection between the source apparatus and the user apparatus, and
- transferring the source data items or user data items with conversion by said data converter.

9. The method according to claim 8 wherein said step of transferring is performed in at least one of a controller serving as a front unit of the source apparatus or a controller serving as a front unit of the user apparatus.

10. The method of claim 8, wherein the step of transferring comprises accessing data of a motor vehicle local area network.

11. The method of claim 8, wherein the step of transferring comprises reading an identification with a reader item, which carries out a recognition of a content of the identification by reading source data stored in said identification through said conversion implemented by said data converter.

12. The method of claim 8, wherein transferring comprises receiving with the user apparatus a command transmitted by an apparatus, which is a source of remote control commands and converting the command by the data converter in order to be usable.

13. Apparatus for preparing a data converter between a source apparatus, in which source data items have been stored according to a predetermined specification of source representation and a user apparatus having a specification of user representation for utilization of user data items, wherein said source data items and said user data items are encoded using different encoding formats, the apparatus comprising:
- a computer-readable storage apparatus, for storing a pair of machine-interpretable descriptors, namely a source descriptor and a user descriptor of the source and user specifications, respectively, said source descriptor comprising at least a reference of a first semantic graph representing a first thesaurus of said source apparatus, and said user descriptor comprising at least a reference of a second semantic graph representing a second thesaurus of said user apparatus;
- means for detecting a presence of a connection between the source apparatus and the user apparatus;
- in response to the presence of the connection, means for transferring the machine-interpretable source descriptor from the source apparatus to the user apparatus, or transferring the machine-interpretable user descriptor from the user apparatus to the source apparatus;
- a comparator arranged for achieving a comparison between the source descriptor and the user descriptor and for determining at least one discordance therefrom;
- means for using the at least one discordance, in combination with said first and second semantic graphs of respectively said source and said user descriptors, to set up a machine-interpretation block to control a conversion by the data converter between homologous data elements of the source descriptor and the user descriptor, respectively; and
- means for using the machine-interpretation block to perform the conversion on at least one of the homologus data elements.

14. The apparatus according to claim 13, comprising correlation means arranged for establishing the first and second semantic graphs and/or a semantic level conversion algorithm, which is integrated into the block.

15. A non-transitory computer-readable data storage medium storing a computer program comprising a set of instructions, which can be run on a computer, to implement a method for preparing a data converter between a source apparatus, in which source data items have been stored according to a predetermined specification of source representation and a user apparatus having a specification of user representation for utilization of user data items, wherein said source data items and said user data items are encoded using different encoding formats, the method comprising:
- an initial step of providing a pair of machine-interpretable source and user descriptors of the source and user specifications of representation, respectively, said source descriptor comprising at least a reference of a first semantic graph representing a first thesaurus of said source apparatus, and said user descriptor comprising at least a reference of a second semantic graph representing a second thesaurus of said user apparatus;
- detecting a presence of a connection between the source apparatus and the user apparatus;
- in response to the presence of the connection, transferring the machine-interpretable source descriptor from the source apparatus to the user apparatus, or transferring the machine-interpretable user descriptor from the user apparatus to the source apparatus;
- comparing the source descriptor and the user descriptor to determine therefrom at least one discordance,
- using the at least one discordance, in combination with said first and second semantic graphs of respectively said source and said user descriptors, to set up a machine-interpretation block to control a conversion by said data converter between homologous data elements of the source descriptor and the user descriptor respectively; and using the machine-interpretation block to perform the conversion on at least one of the homologus data elements.

16. The non-transitory computer-readable data storage medium of claim 15, wherein the method further comprises:
setting up the connection between the source apparatus and the user apparatus, and
transferring the source data items or the user data items with conversion by said data converter.

17. The method of claim 1, further comprising:
after setting up the machine-interpretation block, transferring the source data items of at least one of the homologous data elements from the source apparatus to the user apparatus, or transferring the user data items of at least one of the homologous data elements from the user apparatus to the source apparatus.

18. The method of claim 17, wherein the data converter uses the machine-interpretation block to perform the conversion on the at least one homologus data element that is transferred in the step of transferring.

19. The method of claim 1, wherein:
using the at least one discordance to set up the machine-interpretation block comprises setting-up the machine-interpretation block without any human intervention.

20. The method of claim 1, wherein:
said source descriptor comprises at least a reference of the first semantic graph representing the first thesaurus of said source apparatus and a first structural scheme of said source data items, said user descriptor comprises at least a reference of the second semantic graph representing the second thesaurus of said user apparatus and a second structural scheme of said user data items, using the at least one discordance, in combination with said first and second semantic graphs and said first and second structural schemes of respectively said source and said user descriptors, to set up the machine-interpretation block without any human intervention; and the machine-interpretation block is set up so that the conversion implements at least one element belonging to the group consisting of:
a conversion routine implementing at least one decompression or at least one truncation,
a binary-to-text syntax conversion, or
a semantic level conversion algorithm applying a multiplication factor.

* * * * *